(12) United States Patent
Jalkanen et al.

(10) Patent No.: US 12,095,890 B2
(45) Date of Patent: Sep. 17, 2024

(54) MONITORING OF COMMUNICATION (71) Applicant: Telia Company AB, Solna (SE)

(72) Inventors: Tero Jalkanen, Tuusula (FI); Tomi Sarajisto, Helsinki (FI)

(73) Assignee: TELIA COMPANY AB, Solna (SE)

(*) Notice: Subject to any disclaimer, the term of this patent is extended or adjusted under 35 U.S.C. 154(b) by 0 days.

(21) Appl. No.: 17/667,039

(22) Filed: Feb. 8, 2022

(65) Prior Publication Data
US 2022/0256016 A1 Aug. 11, 2022

(30) Foreign Application Priority Data

Feb. 9, 2021 (FI) ...................................... 20215131

(51) Int. Cl.
*H04L 69/22* (2022.01)
*H04L 5/00* (2006.01)
(Continued)

(52) U.S. Cl.
CPC ............ *H04L 69/22* (2013.01); *H04L 5/0048* (2013.01); *H04L 43/0888* (2013.01); *H04L 43/0894* (2013.01); *H04L 43/18* (2013.01)

(58) Field of Classification Search
CPC ... H04L 69/22; H04L 5/0048; H04L 43/0888; H04L 43/0894; H04L 43/18; H04L 43/08; H04L 43/12; H04L 43/028
See application file for complete search history.

(56) References Cited

U.S. PATENT DOCUMENTS

| 11,799,779 B1* | 10/2023 | Yungelson | ............ H04L 45/123 |
| 2011/0249572 A1* | 10/2011 | Singhal | ................ H04L 43/062 |
| | | | 370/252 |

(Continued)

FOREIGN PATENT DOCUMENTS

| WO | 2018/161850 | 9/2018 |
| WO | 2019/041029 | 3/2019 |

(Continued)

OTHER PUBLICATIONS

European Search Report issued in European Patent Application No. 22155400.9 dated Jun. 27, 2022.

(Continued)

*Primary Examiner* — Schquita D Goodwin
(74) *Attorney, Agent, or Firm* — NIXON & VANDERHYE (57) ABSTRACT

Disclosed is a method for monitoring a communication between a first entity and a second entity. The method includes: receiving measurement data indicative of a payload data; receiving metadata from data storage configured to store metadata received prior to the payload data traffic; comparing at least one parameter derivable from the measurement data to respective at least one parameter derivable from the metadata, and setting a detection result to express one of the following: (i) the payload data between the first communicating entity and the second communicating entity complies with the metadata, (ii) the payload data between the first communicating entity and the second communicating entity deviates from the metadata. Also disclosed is a network node, to a communication system, and to a computer program.

14 Claims, 3 Drawing Sheets

(51) Int. Cl.
   *H04L 43/0888*   (2022.01)
   *H04L 43/0894*   (2022.01)
   *H04L 43/18*      (2022.01)

(56) References Cited

U.S. PATENT DOCUMENTS

| | | | |
|---|---|---|---|
| 2017/0373950 | A1 | 12/2017 | Szilagyi et al. |
| 2018/0102997 | A1* | 4/2018 | Bachmann ............ H04L 67/562 |
| 2018/0123961 | A1* | 5/2018 | Farmanbar .......... H04L 41/5054 |
| 2018/0234326 | A1* | 8/2018 | Swierk ................. H04L 43/08 |
| 2018/0287947 | A1* | 10/2018 | Zsohar ................. H04L 43/12 |
| 2018/0309637 | A1* | 10/2018 | Gill ....................... H04L 41/145 |
| 2019/0068625 | A1* | 2/2019 | Alfano ................ H04L 63/1408 |
| 2019/0116520 | A1* | 4/2019 | Chaponniere ......... H04W 28/06 |
| 2019/0199613 | A1 | 6/2019 | Jambur Sathyanarayana et al. |
| 2019/0215863 | A1* | 7/2019 | Kim ....................... H04W 76/19 |
| 2019/0313401 | A1* | 10/2019 | Wang ................... H04W 72/23 |
| 2019/0380037 | A1* | 12/2019 | Lifshitz ................. G06N 20/20 |
| 2020/0106790 | A1* | 4/2020 | Bagnall ............... H04L 63/1416 |
| 2020/0374238 | A1* | 11/2020 | Momchilov .......... H04L 47/781 |
| 2021/0306912 | A1* | 9/2021 | Stojanovski .......... H04W 76/10 |
| 2021/0320944 | A1* | 10/2021 | Ogle ....................... G06N 20/00 |
| 2022/0015067 | A1* | 1/2022 | Li ........................ H04B 7/0639 |
| 2022/0030488 | A1* | 1/2022 | Han ...................... H04L 5/0098 |
| 2022/0104114 | A1* | 3/2022 | Garcia Martin ...... H04W 76/12 |
| 2022/0141195 | A1* | 5/2022 | Flavel .................... H04L 63/04 726/4 |
| 2022/0167171 | A1* | 5/2022 | Iapalucci ............ H04W 12/122 |

FOREIGN PATENT DOCUMENTS

| | | | | |
|---|---|---|---|---|
| WO | 2020/164747 | A1 | 8/2020 | |
| WO | WO-2020224755 | A1 * | 11/2020 | ......... H04L 41/5025 |

OTHER PUBLICATIONS

Intel, "Updates to solution 18: Removal EN related to identification of serving AMF," 3GPP TSG-SA3 Meeting #101-Bis-e, e-meeting, Jan. 18-29, 2021, S3-210182, 5 pages.

3rd Generation Partnership Project, Technical Specification, 3rd Generation Partnership Project; Technical Specification Group Services and System Aspects; Management and orchestration; 5G performance measurements (Release 17), 3GPP TS 28.552 v17.1.0, Dec. 2020, 207 pages.

Search Report for FI20215131, dated Oct. 19, 2021, 2 pages.

3GPP TR 23.791 V16.2.0, 3$^{rd}$ Generation Partnership Project; Technical Specification Group Services and System Aspects, Study of Enablers for Network Automation for 5G (Release 16), Jun. 11, 2019, p. 1-124

* cited by examiner

MONITORING OF COMMUNICATION

This application claims priority to FI Patent Application No. 20215131 filed 9 Feb. 2021, the entire contents of which are hereby incorporated by reference.

BACKGROUND OF THE INVENTION

Field of the Invention

The invention concerns in general the technical field of telecommunications. More particularly, the invention concerns a monitoring of a communication.

Description of the Related Art

Communication network monitoring is an important task to detect any malfunction of the communication network, but also to control the communication network to operate in optimal manner e.g. in accordance with the network traffic conditions.

One specific approach in the network monitoring is an aim to discover abnormal traffic patterns, since that kind of behavior typically means there is some kind of malfunction in a network node, cyber-attack or other problem situation which should be found and fixed as soon as possible.

On the other hand, the communication networks are getting more and more complex all the time. For example, new protocols need additional support. This can easily lead into situation where manual misconfiguration causes problems, such as a required port is not open in all the firewalls in the path between the communicating entities, such as a terminal device and a server. These kinds of events cause malfunction in the communication network which needs to be detected in order to fix the operation.

In order to control the operation of the network there are introduced prior art solutions in which the data traffic is analyzed, and the control operations are performed in accordance with the information obtained from the analysis. Such controlling may be performed in accordance with a type of data carried in the data packets. Hence, these kinds of approaches are based on analyzing the data packets, such as a metadata of the data packet or even a payload of the data packet with known methods, such as deep packet inspection (DPI).

These known methods are operative as such, but they still lack functionalities which are needed in modern communication networks, such as in 5G mobile communication networks. For example, it is commonly known that the DPI approach is a rather straightforward mechanism, but it does not catch all the problems experienced in the communication network. Further, it requires constant updates due to new protocols and traffic cases. As it comes to communication in which heavy data traffic streams are carried, such as in 5G, the DPI approach requires lot of computing resources due to its nature as a process intensive and, thus, an expensive mechanism.

Hence, there is need to introduce new solutions for network monitoring which may be applied in modern communication networks.

SUMMARY OF THE INVENTION

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An object of the invention is to present a method, a network node, a communication system, and a computer program for monitoring a communication between a first communicating entity and a second communicating entity.

The objects of the invention are reached by a method, a network node, a communication system, and a computer program as disclosed and claimed.

According to a first aspect, a method for monitoring a communication between a first communicating entity and a second communicating entity is provided, the method, performed by a network node, comprises: receiving measurement data indicative of a payload data between the first communicating entity and the second communicating entity; receiving metadata from data storage configured to store metadata received prior to the payload data traffic, the metadata being indicative of the payload data carried in a payload data traffic between the first communicating entity and the second communicating entity; comparing at least one parameter derivable from the measurement data to respective at least one parameter derivable in the metadata; and setting, in accordance with a comparison between the at least one parameter of the measurement data and the respective at least one parameter of the metadata, a detection result to express one of the following: (i) the payload data between the first communicating entity and the second communicating entity complies with the metadata, (ii) the payload data between the first communicating entity and the second communicating entity deviates from the metadata.

The metadata may be received from the data storage by inquiring it with an identifier associated to the payload data. The identifier may e.g. be one of: an identifier of a communication session between the first communicating entity and the second communicating entity; an identifier of at least one of the communicating entities.

Moreover, the metadata may be stored in the data storage by the network node upon receipt of the metadata over a signaling plane.

For example, the at least one parameter compared in the comparison may be indicative of at least one of: data type of the payload data; applied protocol; a volume of data; transfer rate of data, information on ports used in communication, IP addresses applied in the communication, IP packet size, a type of payload data traffic.

The method may further comprise, in response to that the detection result expresses that the payload data traffic between the first communicating entity and the second communicating entity deviates from the metadata: a generation of a control signal to cause at least one of: a shut-down the connection over which the payload data traffic occurs; shaping the data traffic to comply with the information received in the metadata; re-selecting a slice for the communication between the first communicating entity and the second communicating entity.

For example, the network node performing the method may be an Access and Mobility Management function (AMF) of a 5G wireless communication network.

According to a second aspect, a network node for monitoring a communication between a first communicating entity and a second communicating entity is provided, the network node configured to: receive measurement data indicative of a payload data between the first communicating entity and the second communicating entity; receive metadata from data storage configured to store metadata received prior to the payload data traffic, the metadata being indicative of the payload data carried in a payload data traffic between the first communicating entity and the second communicating entity; compare at least one parameter derivable from the measurement data to respective at least one parameter derivable from the metadata; and set, in accordance with a comparison between the at least one parameter received of the measurement data and the respective at least one parameter received of the metadata, a detection result to express one of the following: (i) the payload data between the first communicating entity and the second communicating entity complies with the metadata, (ii) the payload data between the first communicating entity and the second communicating entity deviates from the metadata.

The network node may be configured to receive the metadata from the data storage by inquiring it with an identifier associated to the payload data. The network node may be configured to apply as the identifier one of: an identifier of a communication session between the first communicating entity and the second communicating entity; an identifier of at least one of the communicating entities.

For example, the network node may be configured to store the metadata in the data storage upon receipt of the metadata over a signaling plane.

Moreover, the network node may be configured to compare the at least one parameter compared in the comparison which is indicative of at least one of: data type of the payload data; applied protocol; a volume of data; transfer rate of data, information on ports used in communication, IP addresses applied in the communication, IP packet size, a type of payload data traffic.

The network node may further be configured to, in response to that the detection result expresses that the payload data traffic between the first communicating entity and the second communicating entity deviates from the metadata: generate a control signal to cause at least one of: a shut-down the connection over which the payload data traffic occurs; shaping the data traffic to comply with the information received in the metadata; re-selecting a slice for the communication between the first communicating entity and the second communicating entity.

For example, the network node performing the method may be an Access and Mobility Management function (AMF) of a 5G wireless communication network.

According to a third aspect, a communication system is provided, the communication system comprising: a first communicating entity and a second communicating entity, and a network node according to the second aspect as defined above.

According to a fourth aspect, a computer program is provided, the computer program comprising instructions which, when the computer program is executed by at least one computer, cause the at least one computer to perform the method according to the first aspect as defined above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
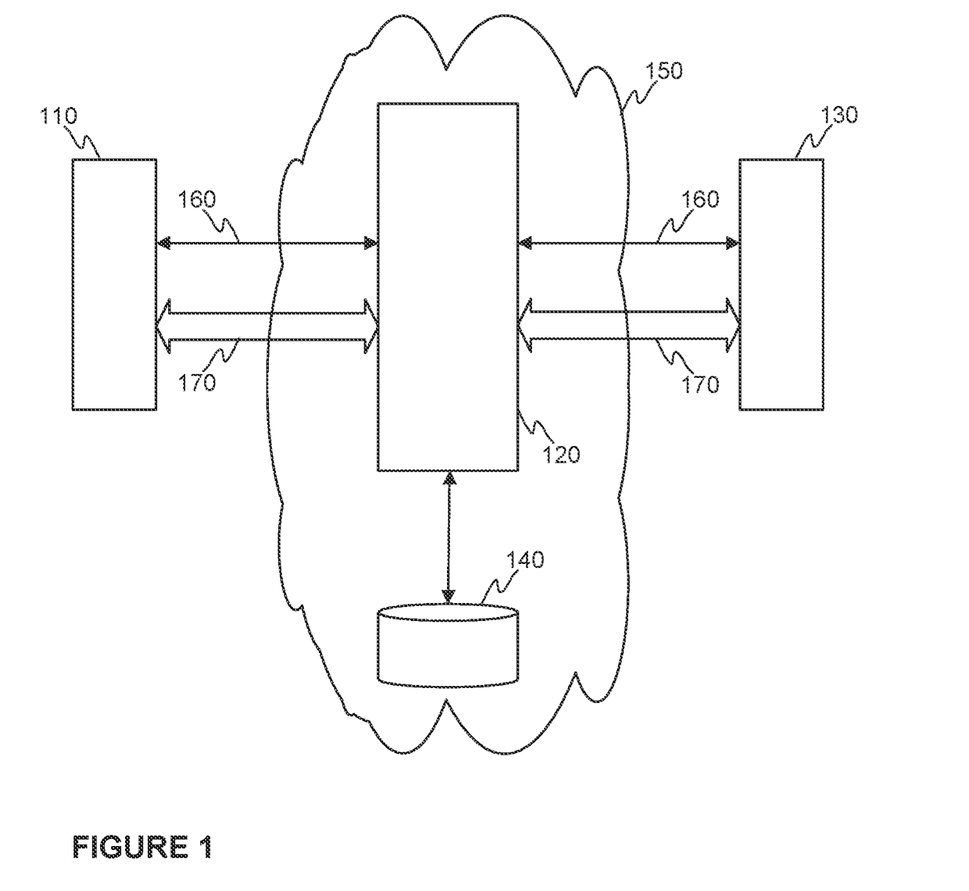
FIG. 1 illustrates schematically a communication system according to an example.

FIG. 1 illustrates schematically a communication system into which the present invention may be implemented in a manner as described in the forthcoming description. In the communication environment a first communicating entity 110 and a second communicating entity 130 may be arranged to communicate with each other over a mobile communication network 150 wherein at least one network node 120 is configured to access the communication between the communicating entities 110, 130. The access to the communication shall be understood so that the access allows the network node 120 to obtain data and information from the communication in a manner as is described herein. The network node 120 is configured to have access to a database 140 which is arranged to store data called as a metadata being indicative of payload data conveyable in the communication network 150, and through the network node 120. In other words, the metadata may be stored in the database 140 by receiving the metadata e.g. from one of the communicating entities 110, 130 either through the network node 120 or directly from at least one of the respective communicating entities 110, 130.

The communicating entities 110, 130 may be any devices suitable for being communicatively connected so that a communication service provided by the communication network 150 in question may be used to. Since the communication network 150 is a wireless mobile communication network, also referred with reference 150 from now on, at least one of the communicating entities 110, 130 is configured to be communicatively connected to the mobile communication network 150 in a wireless manner by implementing the wireless communication protocol provided by the mobile communication network 150. A wireless access to the communication network 160 by the at least one wireless communicating entity 110, such as a wireless terminal comprising a wireless modem, may be established over a radio access network being communicatively connected to a core network in which the network node 120 may reside. The database 140 may also reside in the core network or being external to it. In case, one of the communicating entities 110, 130 is not a wireless terminal, it may be communicatively connected in a wired manner, e.g. by applying an applicable communication protocol for the communication, such as TCP/IP. In such a case the respective communicating entity 110, 130 may reside in a communication network external to the mobile communication network 150, such as in an IP based data network, like Internet, or it may reside in the mobile communication network 150. For example, the respective communicating entity 110, 130 may be a server device configured to serve, at least in part, an operation of the other communicating entity 110, 130, such as the wireless terminal. A practical example of the device comprising the wireless terminal may be a drone which is served by a server device, and the communication is implemented with the drone in the wireless manner. The communication between the communicating entities is arranged to be implemented at least in part through the network node 120.

In accordance with the present invention the communication between the communicating entities 110, 130 comprise both signaling traffic referred with 160 in FIG. 1, but also a payload data traffic referred with 170 in FIG. 1. The communication with the mentioned types of traffic shall be understood so that the network node 120 may access the data carried in the communications but not necessarily modifying the communication in any manner between the communicating entities when the respective communication passes the network node 120. This may be a desired arrangement especially with respect to the payload data which carries data intended to the recipient. Hence, it may be arranged so that the network node 120 may access the data to an extent as is described in the forthcoming description.

Figure 2:
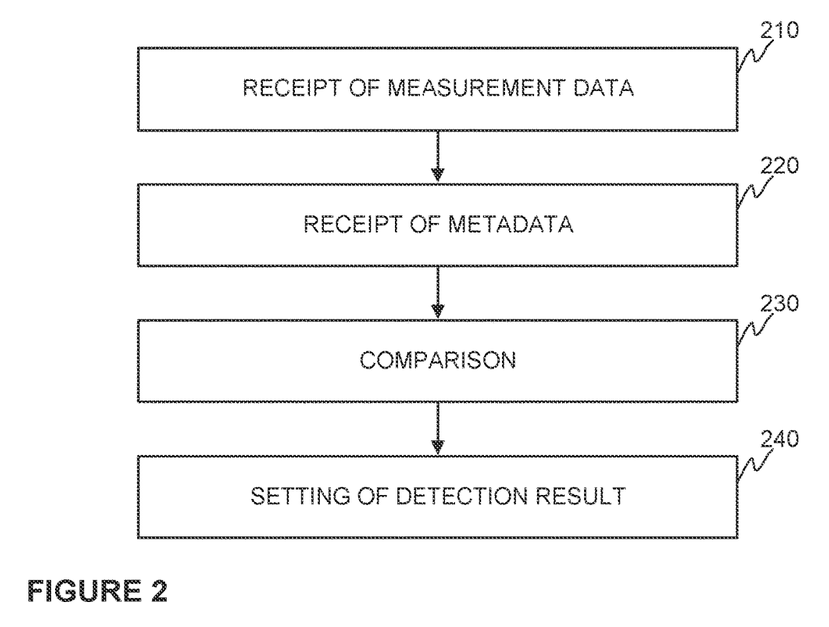
FIG. 2 illustrates schematically a method according to an example.

Next, at least some aspects of the present invention are described by referring to FIG. 2 illustrating schematically a method according to an example. The method is illustrated and described from the network node 120 point of view in order to perform a monitoring of a communication between a first communicating entity 110 and a second communicating entity 130. As a prerequisite for the method the network node 120 may be arranged to access metadata over a signaling plane which metadata is received from at least one of the communicating entities 110, 130 being e.g. a wireless terminal and a server device, respectively. The metadata may e.g. be received by the network node 120 from at least one of the mentioned entities 110, 130 in a context of setting up a connection between the first communicating entity 110 and the second communicating entity 130. Hence, the metadata may be received during the setting up the connection or after the connection is setup, e.g. during a registration process. For example, a first communicating entity 110 may be configured to request attachment to the communication network 150 and upon attachment request service from the second communicating entity 130 with a connection request. In other words, the attach request causes a connection to the communication network 150 and the first communicating entity 110 may request a service, such as to set up a connectivity to use a certain service, from the second communicating entity 130. In response to that the first and the second communicating entities 110, 130 have negotiated on the provision of the requested service one of the mentioned entities may generate a signal 160 over a signaling plane, the signal including the metadata to the network node 120. The metadata comprises at least data indicative of a forthcoming payload data traffic between the first communicating entity 110 and the second communicating entity 130. For example, the metadata may comprise data indicating the provided service between the communicating entities 110, 130, but also one or more predefined parameters being indicative of the payload data carried during the service provision. Such parameters may be indicative of a data type to be transferred, applied protocol or protocols, a volume of data, transfer rate of data, information on ports used in communication, IP addresses applied in the communication, IP packet size, a type of traffic (e.g. continuous traffic/recurring traffic) and similar. Summarizing above, the metadata defines a "fingerprint" for the forthcoming payload data transferred between the communicating entities 110, 130. The received metadata, or at least portion of it, may be stored by the network node 120 to data storage referred with the database 140 herein. Alternatively to the above described way to deliver the metadata over the network node 120, it may also be directly delivered to the data storage referred with the database 140 and arranged to be accessible to the network node 120 in a manner as described in the forthcoming description. For sake of completeness, the stored metadata may also comprise an identifier identifying the communication session from which the metadata is stored from, and/or at least one of the communicating entities.

The above given description is mainly describing an example in which the metadata is signaled to the network node 120 during the attachment procedure. However, it may be arranged to be performed with signaling relating to registration of the terminal, or a subscription, to the network in which the core network may provide the metadata, or any indication on that, to the network node 120. However, the same may be arranged to occur when the first communicating entity 110, or the second communicating entity 130, request to use the service the metadata is related to. Prior to executing the service the entity in question may be configured to deliver the metadata to the network node 120 e.g. through data storage.

Reverting back to FIG. 2, the communicating entities 110, 130 may initiate an exchange of the payload data in the context of the service provision. In accordance with the method, the network node 120 may receive 210 data called as measurement data for the purpose of describing at least some aspects of the present invention. The receipt of the measurement data 210 shall be understood in a broad manner to cover at least both that the network node 120 itself, being in a position of having access to the payload data, obtains, or determines, the measurement data from the payload data traffic, and that the network node 120 receives the measurement data from another network entity. The measurement data may correspond to a number of data values derived from the payload data of the payload data traffic. In other words, the data values shall correspond to at least some of the parameters derivable from the metadata. For example, the network node 120, or the network entity configured to generate the measurement data, may be configured to derive the number of parameters from the payload data, or at least from a number of samples captured from the payload data traffic. Again, an identifier indicative of the communication session, and/or at least one of the communicating entities may be obtainable from the payload data traffic.

In response to the receipt of the measurement data 210 indicative of a number of predefined aspects of the payload data the network node 120 may be configured to obtain the metadata from data storage storing it. The metadata may be received 220 from the data storage, such as the database 140 or even an internal memory of the network node 120, by inquiring it in a predefined manner therefrom. In other words, the receipt of the metadata 220 may be performed by generating an inquiry to the respective data storage, such as to the database 140. The inquiry may be arranged to comprise data defining the metadata inquired with the inquiry. For example, such data may be an identifier used in the solution, such as the identifier indicative of the communication session, and/or an identifier of at least one of the communicating entities. The inquiry performed in an appropriate manner returns the metadata to the network node 120 and, hence, the network node 120 now possesses the pieces of data for performing a comparison 230.

Next, the network node 120 is configured to perform the comparison 230 so that the measurement data is compared 230 to the metadata. More specifically, the comparison 230 is performed by comparing a number of corresponding parameter values derivable from the measurement data and from the metadata to each other. The outcome of the comparisons of the number of the parameters may be combined together e.g. by determining a common result indicative of the comparison process. For example, this may be done in a relatively simple manner, e.g. by taking 10 parameters and check if variation in these measured values exceeds some predefined value, such as 10% compared to the original values in the fingerprint. For example, if the amount of traffic sent in an hour is predicted in the fingerprint to be 1 MB and the actual measured value is 10 MB, then this detection may be interpreted to deviate more than allowed, and necessary measures may be initiated.

In response to the comparison 230 a detection result may be set 240 to express one of the following: (i) the payload data between the first communicating entity 110 and the second communicating entity 130 complies with the metadata, (ii) the payload data between the first communicating entity 110 and the second communicating entity 130 deviates from the metadata. In other words, in step 240 the network node 120 may be arranged to compare the comparison result, or comparison results, to respective reference value, or reference values, and based on the outcome of the comparison, to set the detection result as described. Hence, the detection result expresses if the payload traffic really is such what is indicated to the network node 120 in the metadata prior to the delivery of the payload data.

Especially, in case that the detection result is set to express that the payload data does not correspond to information given in the metadata, the network node 120 may be configured to perform a number of predefined actions. The number of predefined actions may comprise, but is not limited to, at least one of the following: the network node 120 is configured to generate a control signal to shut down the connection over which the payload data traffic occurs. The control signal may be an internal signal of the network node 120 in case the network node 120 is authorized in disconnecting the communicating entities 110, 130. Alternatively or in addition, the network node 120 may be configured to generate the control signal to another network entity which is authorized to manage the connections and disconnect the connection. Another applicable approach in case of the payload data does not correspond to the metadata may be that the network node 120 is configured to generate a control signal to at least one of the communicating entities 110, 130 wherein the control signal carries data indicative of the mismatch of the payload data compared to the metadata. The data may also indicate that the network node 120 requests shaping the traffic to comply with the information received in the metadata. This may be necessary e.g. from a resourcing point of view since the communication network may not be capable of providing service if the payload traffic continues to mismatch with the metadata. Still further, in some example embodiments the control signal may be delivered to a network entity managing and selecting the network resources for the communication and in such a case the control signal may carry a request to re-select a slice of a 5G network for the communication between the first communicating entity 110 and the second communicating entity 130.

Figure 3:
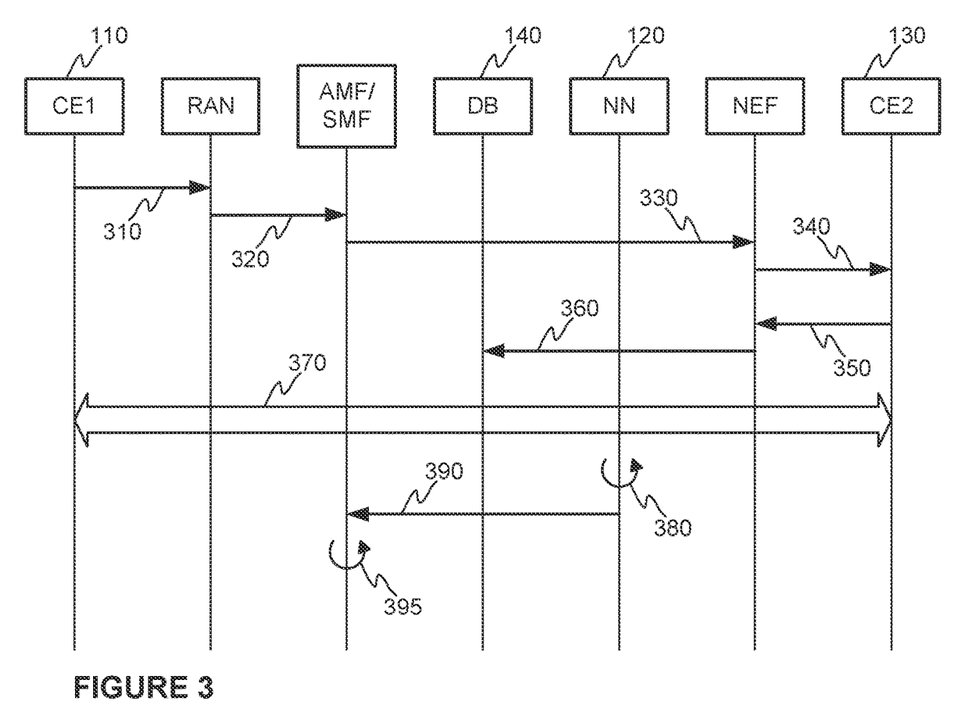
FIG. 3 illustrates schematically a method as a flow chart according to an example.

FIG. 3 illustrates schematically an example of a flow chart in a communication environment implemented with 5G wireless communication network. The network node 120 and the database 140 of the present invention are a part of the communication path in the 5G network as is described in the forthcoming description. The first communicating entity 110 is a wireless terminal communicatively connected to a radio access network, RAN, of the 5G network. The RAN in 5G network may comprise base stations referred with gNodeBs and the RAN is communicatively connected to a functionality called as AMF/SMF in a core network of 5G network. The AMF/SMF herein refers to combined functionalities of elements configured to perform an Access and Mobility Management function (AMF) and a Session Management Function (SMF). In other words, both the wireless terminal and the gNodeB employs the Next Generation Application Protocol (NGAP) to carry Non Access Stratum (NAS) messages across the N1 or N2 reference interfaces for requesting a new session. The Access and Mobility Management Function (AMF) receives the requests and is configured to manage anything to do with connection or mobility management while forwarding session management requirements over the N11 interface to the SMF. The AMF determines which SMF is best suited to manage the connection request by querying the Network Repository Function (NRF). The session establishment is conveyed from the AMF/SMF functionalities to a Network Exposure Function (NEF) which is a functional element providing, among its other tasks, an integration layer that enables connecting external applications, such as the second communicating entity 130 in the present invention, to the operator's 5G network.

Reverting back to FIG. 3 it schematically illustrates a flow chart wherein the first communicating entity 110 attaches to the 5G network and connects to the second communicating entity 130. This chain of signaling is referred with references 310, 320, 330, and 340 in FIG. 3. The signaling may carry information relating to a service the first communicating entity 110 requests from the second communicating entity 130, for example. In accordance with the present invention, at least one of the communicating entities 110, 130 is configured to generate a signal over the signaling plane to a network node 120, or even directly to a database 140, the signaling comprising metadata being indicative of payload data to be conveyed between the communicating entities 110, 130 during a provision of the service. This signaling is referred with signals 350 and 360 in FIG. 3. At some point of time the payload data traffic is initiated between the communicating entities 110, 130 (arrow referred with 370 in FIG. 3). The network node 120 may be provided with an access to the payload data so that it may receive 210 the measurement data representing the payload data in a predefined manner. The network node 120 may be configured to perform the analysis as described by comparing the measurement data with the metadata inquired from the database 140. The analysis phase is referred with a reference 380 in FIG. 3. In accordance with an example, the network node 120 may be configured to generate a signal to an entity in the communication network (referred with a reference 390 in FIG. 3), such as the AMF/SMF, which signal may carry data indicative of the detection result as an outcome of the analysis 380. This is especially important in a situation in which the analysis indicates that there is a mismatch between the payload data and the metadata so that the network element receiving the information on the analysis may initiate predefined procedure (referred with a reference 395 in FIG. 3). The entity to which the signal 390 is delivered may be selected so that it is suitable to perform the tasks in accordance with the outcome of the analysis, such as disconnecting the connection.

For sake of completeness it is worthwhile to mention that even if the network node 120 performing at least a portion of the operation according to the present invention is described as a separate entity, its functionality may be integrated into a network element existing in the respective communication network. Due to its nature as a controlling element the AMF may be named as an example into which the functionality of the network node 120 may be integrated to.

Figure 4:
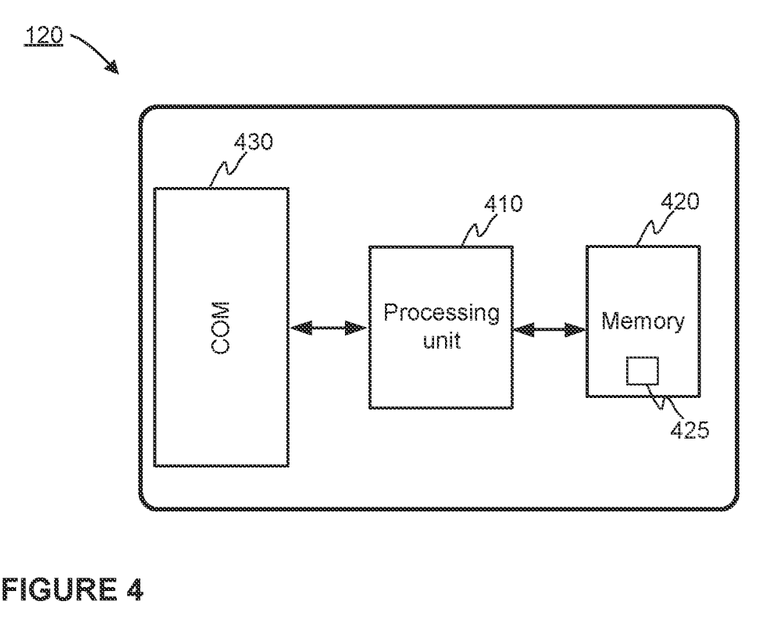
FIG. 4 illustrates schematically an apparatus according to an example.

An example of an apparatus suitable for performing a task of the network node 120 according to an example embodiment the invention is schematically illustrated in FIG. 4. The apparatus may be configured to implement at least part of the method for monitoring a communication between the communicating entities 110, 130 as described. The execution of the method, or at least some portions of it, may be achieved by arranging at least one processor 410 to execute at least some portion of computer program code 425 stored in at least one memory 420 causing the processor 410, and, thus, the network node 120 to implement one or more method steps as described. In other words, the processor 410 may be arranged to access the memory 420 and to retrieve and to store any information therefrom and thereto. Moreover, the processor 410 may be configured to control a communication through one or more communication interfaces 430 for accessing the other entities being involved in the operation. Hence, the communication interface 430 may be arranged to implement, possibly under control of the processor 410, corresponding communication protocols, such as an IP, for communicating with one or more entities. The term communication interface 430 shall be understood in a broad manner comprising necessary hardware and software elements for implementing the communication techniques. Further, the network node 120 in question may comprise one or more input/output devices 440 for inputting and outputting information. Such input/output devices may e.g. be keyboard, buttons, touch screen, display, loudspeaker, microphone camera and so on. In some implementation of the network node 120 at least some of the input/output devices may be external to the network node 120 and coupled to it either wirelessly or in a wired manner. For sake of clarity, the processor 410 herein refers to any unit or a plurality of units suitable for processing information and control the operation of the network node 120 in general at least in part, among other tasks. The mentioned operations may e.g. be implemented with a microcontroller solution with embedded software. Similarly, the invention is not limited to a certain type of memory 420, but any memory unit or a plurality of memory units suitable for storing the described pieces of information, such as portions of computer program code and/or parameters, may be applied in the context of the present invention. Moreover, at least the mentioned entities may be arranged to be at least communicatively coupled to each other with an internal data connection, such as with a data bus.

Some aspects of the present invention may relate to a computer program product which, when executed by at least one processor, cause a network node 120 to perform at least some portions of the method as described.

Still further, some aspects of the present invention relate to a communication system configured to implement a monitoring of a communication in the communication system in the manner as described.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for monitoring a communication on a core network between a first communicating entity and a second communicating entity configured to communicate on the core network, the method, performed by a network node residing on the core network, comprising:
   during an attachment procedure,
      receiving metadata over a signaling plane from at least one of: the first communicating entity and the second communicating entity, and
      storing the metadata with an identifier identifying a communication session from which the metadata is stored from in a data storage;
   receiving measurement data indicative of a payload data between the first communicating entity and the second communicating entity;
   receiving the metadata from the data storage configured to store the metadata received prior to the payload data traffic, the metadata being indicative of the payload data carried in a payload data traffic between the first communicating entity and the second communicating entity, the metadata being inquired from the data storage with the identifier obtained from the measurement data indicative of the payload data, the identifier being indicative of the communication session;
   comparing at least one parameter derivable from the measurement data to respective at least one parameter derivable in the metadata; and
   setting, in accordance with a comparison between the at least one parameter of the measurement data and the respective at least one parameter of the metadata, a detection result to express one of the following:
      (i) the payload data between the first communicating entity and the second communicating entity complies with the metadata, and
      (ii) the payload data between the first communicating entity and the second communicating entity deviates from the metadata.

2. The method of claim 1, wherein the at least one parameter compared in the comparison is indicative of at least one selected from the group consisting of: a data type of the payload data, an applied protocol, a volume of data, a transfer rate of data, information on ports used in communication, IP addresses applied in the communication, an IP packet size, and a type of payload data traffic.

3. The method of claim 1, the method further comprising:
   determining that the detection result expresses that the payload data traffic between the first communicating entity and the second communicating entity deviates from the metadata, and generating a control signal that causes at least one of: a shut-down the connection over which the payload data traffic occurs, shaping the data traffic to comply with the information received in the metadata, and re-selecting a slice for the communication between the first communicating entity and the second communicating entity.

4. The method of claim 1, wherein the network node performing the method is an Access and Mobility Management function (AMF) of a 5G wireless communication network.

5. The method of claim 1, wherein at least one of the first communicating entity and the second communicating entity is a wireless terminal comprising a wireless modem configured to communicate with the core network in which the network node resides.

6. The method of claim 1, wherein the first communicating entity is a server device configured to serve an operation of the second communicating entity, and the second communicating entity is a wireless terminal comprising a wireless modem configured to communicate with the core network in which the network node resides, the communication between the first and second communicating entities implemented at least in part through the network node.

7. A network node for monitoring a communication on a core network between a first communicating entity and a second communicating entity configured to communicate on the core network, the network node configured to:
   during an attachment procedure,
      receive metadata over a signaling plane from at least one of: the first communicating entity and the second communicating entity, and
      store the metadata with an identifier identifying a communication session from which the metadata is stored from in a data storage;
   receive measurement data indicative of a payload data between the first communicating entity and the second communicating entity;
   receive metadata from the data storage configured to store the metadata received prior to the payload data traffic, the metadata being indicative of the payload data carried in a payload data traffic between the first communicating entity the second communicating entity, the metadata being inquired from the data storage with the identifier obtained from the measurement data indicative of the payload data, the identifier being indicative of the communication session;
   compare at least one parameter derivable from the measurement data to respective at least one parameter derivable from the metadata; and
   set, in accordance with a comparison between the at least one parameter received of the measurement data and the respective at least one parameter received of the metadata, a detection result to express one of the following:
      (i) the payload data between the first communicating entity and the second communicating entity complies with the metadata, and
      (ii) the payload data between the first communicating entity and the second communicating entity deviates from the metadata.

8. The network node of claim 7, wherein the network node is configured to compare the at least one parameter compared in the comparison which is indicative of at least one selected from the group consisting of: a data type of the payload data, an applied protocol, a volume of data, a transfer rate of data, information on ports used in communication, IP addresses applied in the communication, an IP packet size, and a type of payload data traffic.

9. The network node of claim 7, the network node is further configured such that when the detection result expresses that the payload data traffic between the first communicating entity and the second communicating entity deviates from the metadata, a control signal is generated that causes at least one of: a shut-down the connection over which the payload data traffic occurs, shaping the data traffic to comply with the information received in the metadata, and re-selecting a slice for the communication between the first communicating entity and the second communicating entity.

10. The network node of claim 7, wherein the network node performing the method is an Access and Mobility Management function (AMF) of a 5G wireless communication network.

11. A communication system for communication on a core network, the communication system comprising:
   a first communicating entity and a second communicating entity, configured to communicate on the core network; and
   a network node configured to monitor a communication on the core network between the first communicating entity and the second communicating entity, the network node configured to:
   during an attachment procedure,
      receive metadata over a signaling plane from at least one of: the first communicating entity and the second communicating entity, and
      store the metadata with an identifier identifying a communication session from which the metadata is stored from in a data storage,
   receive measurement data indicative of a payload data between the first communicating entity and the second communicating entity,
   receive metadata from the data storage configured to store the metadata received prior to the payload data traffic, the metadata being indicative of the payload data carried in a payload data traffic between the first communicating entity and the second communicating entity, the metadata being inquired from the data storage with the identifier obtained from the measurement data indicative of the payload data, the identifier being indicative of the communication session,
   compare at least one parameter derivable from the measurement data to respective at least one parameter derivable from the metadata, and
   set, in accordance with a comparison between the at least one parameter received of the measurement data and the respective at least one parameter received of the metadata, a detection result to express one of the following:
      (i) the payload data between the first communicating entity and the second communicating entity complies with the metadata, and
      (ii) the payload data between the first communicating entity and the second communicating entity deviates from the metadata.

12. The communication system of claim 11, wherein at least one of the first communicating entity and the second communicating entity is a wireless terminal comprising a wireless modem configured to communicate with the core network in which the network node resides.

13. The communication system of claim 11, wherein the first communicating entity is a server device configured to serve an operation of the second communicating entity, and the second communicating entity is a wireless terminal comprising a wireless modem configured to communicate with the core network in which the network node resides, the communication between the first and second communicating entities implemented at least in part through the network node.

14. A non-transitory computer readable medium on which is stored a computer program comprising instructions which, when the computer program is executed by at least one computer, cause the at least one computer to perform a method for monitoring a communication on a core network between a first communicating entity and a second communicating entity, the method comprising:

during an attachment procedure,
receiving metadata over a signaling plane from at least one of: the first communicating entity and the second communicating entity, and
storing the metadata with an identifier identifying a communication session from which the metadata is stored from in a data storage;

receiving measurement data indicative of a payload data between the first communicating entity and the second communicating entity;

receiving metadata from the data storage configured to store the metadata received prior to the payload data traffic, the metadata being indicative of the payload data carried in a payload data traffic between the first communicating entity and the second communicating entity, the metadata being inquired from the data storage with the identifier obtained from the measurement data indicative of the payload data, the identifier being indicative of the communication session;

comparing at least one parameter derivable from the measurement data to respective at least one parameter derivable in the metadata; and setting, in accordance with a comparison between the at least one parameter of the measurement data and the respective at least one parameter of the metadata, a detection result to express one of the following:
  (i) the payload data between the first communicating entity and the second communicating entity complies with the metadata, and
  (ii) the payload data between the first communicating entity and the second communicating entity deviates from the metadata.

* * * * *